(12) United States Patent
Lovelady, III

(10) Patent No.: US 9,909,869 B1
(45) Date of Patent: Mar. 6, 2018

(54) LATHE LEVELER

(71) Applicant: Consolidated Nuclear Security, LLC, Reston, VA (US)

(72) Inventor: Michael W. J. Lovelady, III, Kingston, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 169 days.

(21) Appl. No.: 14/870,263

(22) Filed: Sep. 30, 2015

(51) Int. Cl.
*G01C 9/24* (2006.01)
*B23B 25/06* (2006.01)
*G01C 9/34* (2006.01)

(52) U.S. Cl.
CPC .............. *G01C 9/34* (2013.01); *B23B 25/06* (2013.01); *B23B 2260/094* (2013.01)

(58) Field of Classification Search
CPC .... G01C 9/24; G01C 9/26; G01C 9/34; B23B 25/06
USPC ..................... 33/371, 379, 520, 638
See application file for complete search history.

(56) References Cited

U.S. PATENT DOCUMENTS

| 451,123 | A | * | 4/1891 | Grannis | ............. | B23Q 17/2266 |
|---|---|---|---|---|---|---|
| | | | | | | 33/629 |
| 986,783 | A | * | 3/1911 | Tschop | ..................... | G01C 9/26 |
| | | | | | | 33/332 |
| 1,020,020 | A | * | 3/1912 | Brawley | ................... | G01C 9/26 |
| | | | | | | 33/332 |
| 2,542,938 | A | | 2/1951 | Morris | | |
| 2,667,703 | A | | 2/1954 | Zumkeller | | |
| 3,826,013 | A | * | 7/1974 | Baher | ....................... | G01C 9/24 |
| | | | | | | 33/373 |
| 4,488,360 | A | | 12/1984 | Steighner | | |
| 5,003,703 | A | | 3/1991 | Swanson | | |
| D665,001 | S | | 8/2012 | Gordon | | |
| 8,646,186 | B2 | * | 2/2014 | Lettkeman et al. | ..... | G01C 9/28 |
| | | | | | | 33/365 |

(Continued)

FOREIGN PATENT DOCUMENTS

| CN | 204565139 U | * | 8/2015 | ............. | B23B 25/06 |
|---|---|---|---|---|---|
| JP | 2000155027 A | * | 6/2000 | ............... | G01C 9/28 |

OTHER PUBLICATIONS

Nemi Tool Setting Gage P/N 1193; www.nemi.com , 1 page, date unknown.

(Continued)

*Primary Examiner* — R. A. Smith
(74) *Attorney, Agent, or Firm* — Luedeka Neely Group, PC; Michael J. Renner, Esq.

(57) ABSTRACT

A lathe leveler for centering a cutting tool in relation to a cylindrical work piece includes a first leveling arm having a first contact point disposed adjacent a distal end of the first leveling arm, a second leveling arm having a second contact point disposed adjacent a distal end of the second leveling arm, a leveling gage, and a leveling plate having a cutting tool receiving surface positioned parallel to a horizontal axis of the leveling gage and on a same plane as a midpoint of the first contact point and the second contact point. The leveling arms and leveling plate are dimensioned and configured such that the cutting tool receiving surface is centered in relation to the work piece when the first and second contact points are in contact with one of the inner surface and outer surface of the cylindrical work piece and the leveling gage is centered.

16 Claims, 3 Drawing Sheets

(56) References Cited

U.S. PATENT DOCUMENTS

2004/0187330 A1* 9/2004 Lim .................. G01C 9/36
33/390

OTHER PUBLICATIONS

Lathe Gage Tool Insert Cutter Setting Level Center Height Setter; www.ebay.com/itm/Lathe-Gage-tool-insert-cutter-setting, 3 pages, printed on Dec. 14, 2015.

* cited by examiner

LATHE LEVELER

GOVERNMENT RIGHTS

The U.S. Government has rights to this invention pursuant to contract number DE-NA0001942 between the U.S. Department of Energy and Consolidated Nuclear Security, LLC.

FIELD

This disclosure relates to the field of leveling/centering a cutting tool with respect to a cylindrical work piece. More particularly, this disclosure relates to a handheld lathe leveler.

BACKGROUND

In lathe machining, a cylindrical work piece is rotated along a horizontal axis for cutting of the work piece typically using a single-point cutting tool. To provide cutting of the outer diameter or inner diameter of the work piece according to precise requirements, it is important to center the cutting tool along the horizontal plane extending through the turning axis of the work piece prior to initiating a desired cutting operation. While many tools have been used to assist an operator in centering the cutting tool for cutting the outer diameter of a work piece, these tools are often unnecessarily large and bulky as compared to the size of typical work pieces having a diameter as small as about 3 inches, which makes them inapt for centering the cutting tool when making inner diameter cuts (such as enlarging a hole already drilled into the work piece).

SUMMARY

According to one embodiment of the disclosure, a lathe leveler for centering a cutting tool in relation to a cylindrical work piece includes a first leveling arm having a first contact point disposed adjacent a distal end of the first leveling arm, a second leveling arm having a second contact point disposed adjacent a distal end of the second leveling arm, a leveling gage, and a leveling plate having a cutting tool receiving surface positioned parallel to a horizontal axis of the leveling gage and on a same plane as a midpoint of the first contact point and the second contact point. The first leveling arm, second leveling arm, and the leveling plate are dimensioned and configured such that the cutting tool receiving surface is centered in relation to the cylindrical work piece when the first and second contact points are in contact with one of the inner surface and outer surface of the cylindrical work piece and the leveling gage is centered.

According to certain embodiments, the first contact point and second contact point include rounded edges; the first leveling arm, second leveling arm, and leveling plate are symmetrical along a horizontal axis such that the leveler is usable in both an upright and an inverted position; the lathe leveler further includes a key ring aperture disposed through the leveling plate; the first and second leveling arms are dimensioned and configured to provide a distance of about 0.75 to about 2 inches, and more preferably about 1 inch to about 1.5 inches, between the first contact point and the second contact point.

According to another embodiment of the disclosure, a method of centering a cutting tool in relation to a cylindrical work piece includes providing a lathe leveler as described above; contacting the first contact point and the second contact point of the lathe leveler with one of the inner surface and the outer surface of the cylindrical work piece; rotating the lathe leveler circumferentially with respect to the work piece while maintaining contact of the first contact point and the second contact point with the work piece until the leveling gage is centered; and positioning the cutting tool along the cutting tool receiving surface.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
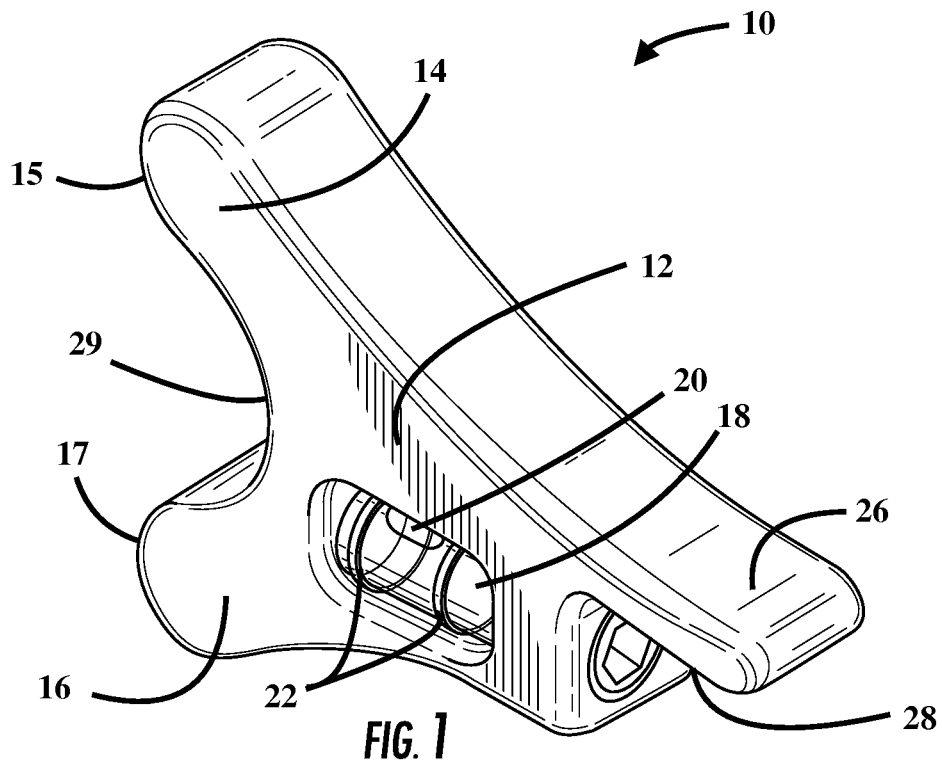
FIGS. 1-2 depict perspective views of a lathe leveler according to one embodiment of the disclosure.
Figure 2:
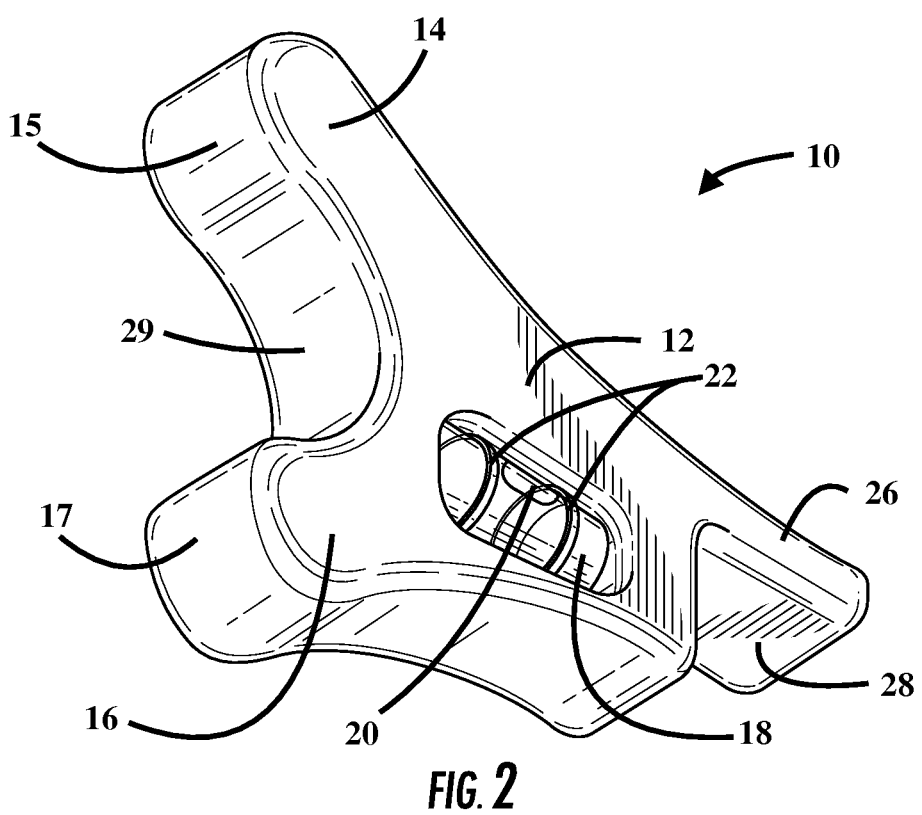
Figure 3:
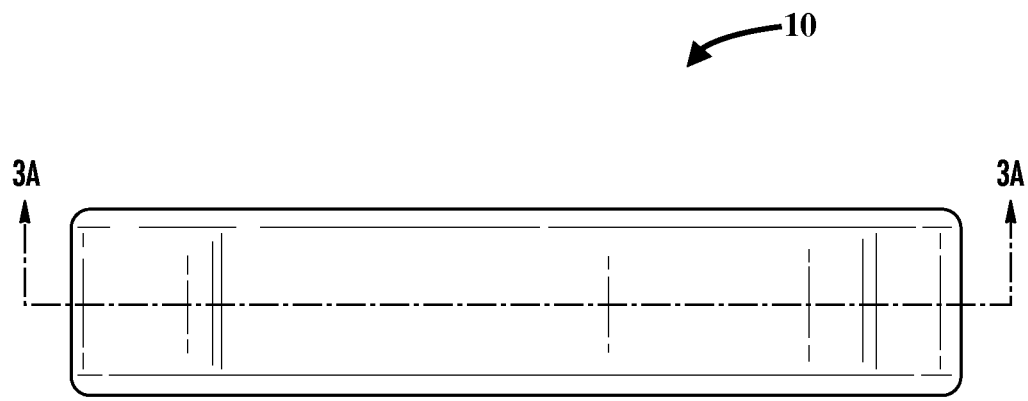
FIG. 3 depicts a top view of the lathe leveler of FIGS. 1-2.
Figure 3A:
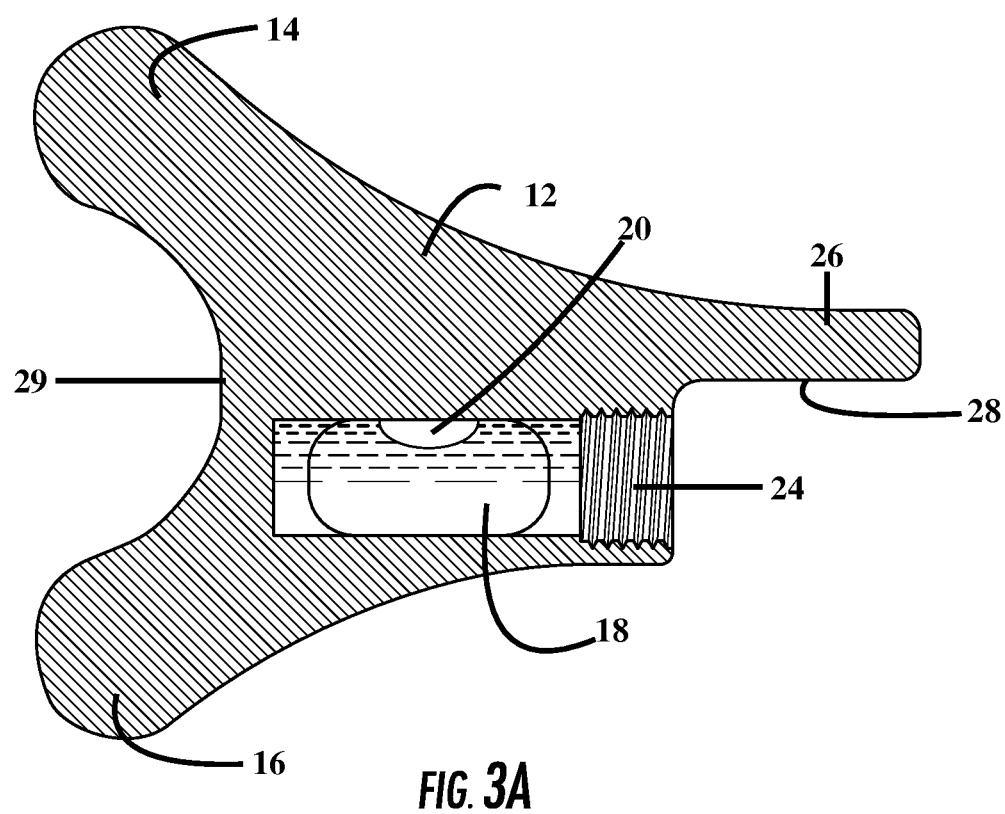
FIG. 3A depicts a cross-sectional view of the lathe leveler taken from plane 3A of FIG. 3.

Referring to FIGS. 1-3A, a leveler 10 is shown according to one embodiment of the disclosure. The leveler 10 generally includes a base portion 12, a first leveling arm 14 extending at an upward angle from a first end of the base portion 12, and a second leveling arm 16 extending at an equivalent downward angle from the first end of the base portion 12. In other words, the leveler 10 includes a base portion 12 having two leveling arms that form a v-shape extending from one end of the base portion 12. Disposed at a distal end of each leveling arm 14, 16 are respective contact points 15, 17 for contacting a cylindrical work piece and centering a cutting tool in relation to the work piece as explained below.

Disposed within the base portion 12 is a leveling gage 18 having a centering bubble 20 and indicating lines 22 as known in the art. The leveling gage 18 is positioned within the base portion 12 such that the centering bubble 20 is disposed within indicating lines 22 when the leveler 10 is in a true horizontal position. In preferred embodiments, the leveling gage is disposed within a bore of the base portion 12 having engagement threads 24 for allowing the leveling gage 18 to be removably secured to the base portion 12 with a set screw.

Disposed adjacent the leveling gage 18 and extending from a second end of the base portion 12 is a leveling plate 26 having a cutting tool receiving surface 28 that is parallel to the horizontal axis of the leveling gage 18 and along the same plane as the midpoint 29 between the contact points 15, 17 of the leveling arms 14, 16. As shown, the base portion 12 having first and second leveling arms 14, 16 extending in opposite angular directions from one end of the base portion 12 and a leveling plate 26 extending from another end of the base portion preferably form a generally y-shaped leveler 10.

Figure 4:
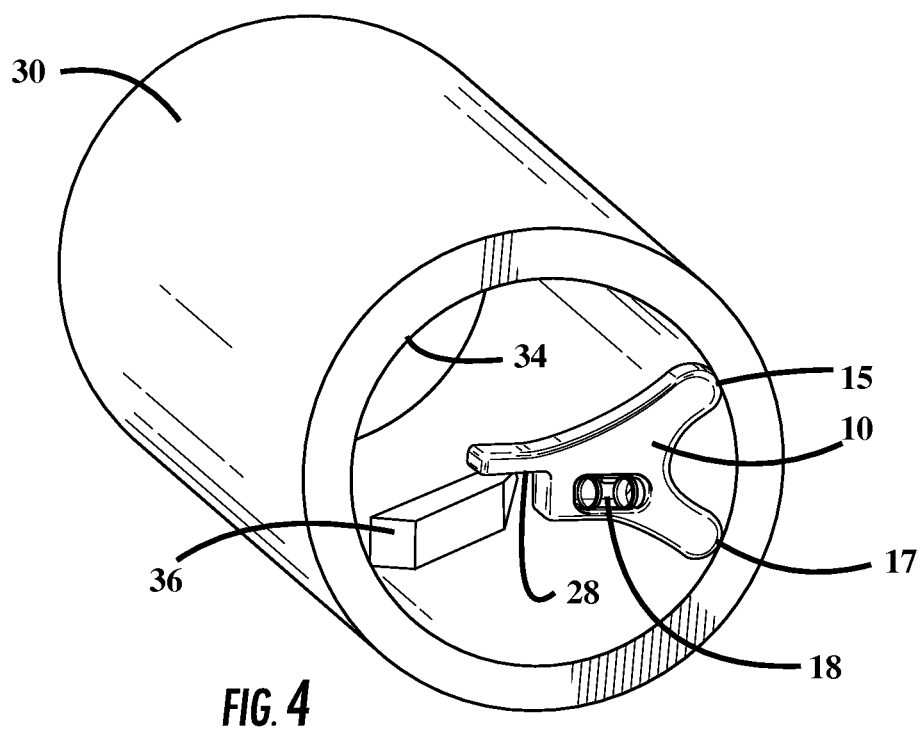
FIG. 4 depicts the lathe leveler of FIGS. 1-3 being used to center a cutting tool with respect to the inner diameter of a work piece.
Figure 5:
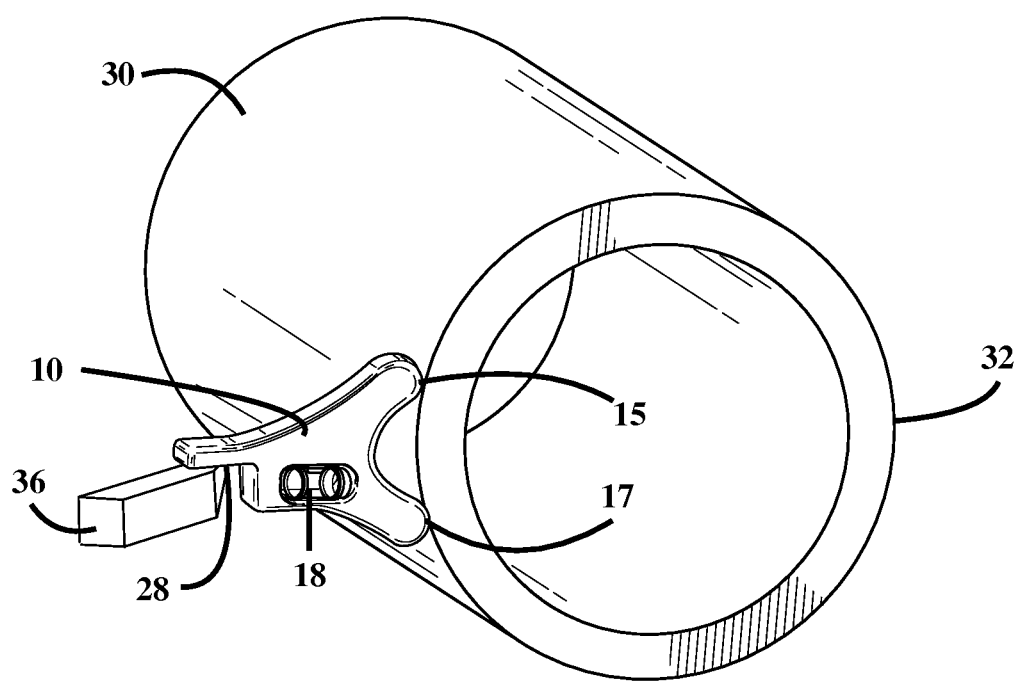
FIG. 5 depicts the lathe leveler of FIGS. 1-3 being used to center a cutting tool with respect to the outer diameter of a work piece.

In operation and with reference to FIGS. 4-5, the leveler 10 is positioned with respect to the work piece 30 such that both contact points 15 and 17 contact the outer diameter 32 (FIG. 5) if making an outer diameter cut or inner diameter 34 (FIG. 4) if making an inner diameter cut. The leveler 10 is then moved circumferentially around the outer diameter 30 or inner diameter 32 depending on the type of cut being made until the centering bubble 20 of leveling gage 18 is disposed within indicating lines 22. At this point, the cutting tool receiving surface 28 is centered in relation to the cylindrical work piece 30 such that a user is able to center the cutting tool 36 by placing the cutting tool 36 against the cutting tool receiving surface 28. It is noted that, due to the symmetry of leveler 10 described above, the leveler 10 works to center the cutting tool 36 whether the leveler 10 is in an upright position where the cutting tool 36 is received below the cutting tool receiving surface 28 as shown in FIGS. 4-5 or in an inverted position in which the cutting tool 36 is received above the cutting tool receiving surface 28.

According to preferred embodiments, the contact points 15, 17 of the leveling arms include rounded edges as shown to assist the leveler 10 in sliding along the surface of the work piece 30 until the centering bubble 20 is centered within indicating lines 22. Further, the distance between the contact points 15, 17 is preferably about 0.75 inches to about 2 inches, and more preferably about 1 inch to about 1.5 inches, while the total length of the leveler from the contact points 15, 17 to the distal end of the cutting tool receiving surface 28 is preferably about 1.75 inches to about 2.75 inches, and more preferably about 2 inches to about 2.5 inches, to ensure that the leveler 10 is able to fit within work pieces 30 having an inner diameter as small as about 3 inches.

According to certain embodiments, the leveler 10 includes a ring or aperture (not shown) for attaching the leveler to a key ring or belt of the user. In preferred embodiments, an aperture is disposed through the leveling plate 26.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A lathe leveler for centering a cutting tool in relation to a cylindrical work piece, the lathe leveler comprising:
 a first leveling arm having a first contact point disposed adjacent a distal end of the first leveling arm;
 a second leveling arm having a second contact point disposed adjacent a distal end of the second leveling arm;
 a leveling gage; and
 a leveling plate having a cutting tool receiving surface positioned parallel to a horizontal axis of the leveling gage and on a same plane as a midpoint of the first contact point and the second contact point,
 the first leveling arm, second leveling arm, and the leveling plate being dimensioned and configured such that the cutting tool receiving surface is centered in relation to the cylindrical work piece when the first and second contact points are in contact with one of the inner surface and outer surface of the cylindrical work piece and the leveling gage is centered.

2. The lathe leveler of claim 1 wherein the first contact point and second contact point include rounded edges.

3. The lathe leveler of claim 1 further comprising a key ring aperture disposed through the leveling plate.

4. The lathe leveler of claim 1 wherein the first and second leveling arms are dimensioned and configured to provide a distance of about 0.75 to about 2 inches between the first contact point and the second contact point.

5. The lathe leveler of claim 1 wherein the first and second leveling arms are dimensioned and configured to provide a distance of about 1 inch to about 1.5 inches between the first contact point and the second contact point.

6. A method of centering a cutting tool in relation to a cylindrical work piece, the method comprising:
 providing a lathe leveler including:
  a first leveling arm having a first contact point disposed adjacent a distal end of the first leveling arm,
  a second leveling arm having a second contact point disposed adjacent a distal end of the second leveling arm,
  a leveling gage, and
  a leveling plate having a cutting tool receiving surface disposed parallel to a horizontal axis of the leveling gage and on the same horizontal plane as a midpoint of the first contact point and the second contact point adjacent a proximal end of the first and second leveling arms;
 contacting the first contact point and the second contact point of the lathe leveler with one of the inner surface and the outer surface of the cylindrical work piece;
 rotating the lathe leveler circumferentially with respect to the work piece while maintaining contact of the first contact point and the second contact point with the work piece until the leveling gage is centered; and
 positioning the cutting tool along the cutting tool receiving surface.

7. The method of claim 6 wherein the first contact point and second contact point include rounded edges.

8. The method of claim 6 wherein the first leveling arm, second leveling arm, and leveling plate are symmetrical along a horizontal axis such that the leveler is usable in both an upright and an inverted position.

9. The method of claim 6 wherein the leveler includes a key ring aperture disposed through the leveling plate.

10. The method of claim 6 wherein the first and second leveling arms are dimensioned to provide a distance of about 0.75 to about 2 inches between the first contact point and the second contact point.

11. The method of claim 6 wherein the first and second leveling arms are dimensioned and configured to provide a distance of about 1 inch to about 1.5 inches between the first contact point and the second contact point.

12. A lathe leveler for centering a cutting tool in relation to a cylindrical work piece, the lathe leveler comprising:
 a first leveling arm having a first contact point disposed adjacent a distal end of the first leveling arm;
 a second leveling arm having a second contact point disposed adjacent a distal end of the second leveling arm;
 a leveling gage; and
 a leveling plate having a cutting tool receiving surface positioned parallel to a horizontal axis of the leveling gage and on a same plane as a midpoint of the first contact point and the second contact point, the first leveling arm, second leveling arm, and the leveling plate being symmetrical along a horizontal axis such that the cutting tool receiving surface is centered in relation to the cylindrical work piece in both an upright and an inverted position when the first and second contact points are in contact with one of the inner surface and outer surface of the cylindrical work piece and the leveling gage is centered.

13. The lathe leveler of claim 12 wherein the first contact point and second contact point include rounded edges.

14. The lathe leveler of claim 12 further comprising a key ring aperture disposed through the leveling plate.

15. The lathe leveler of claim 12 wherein the first and second leveling arms are dimensioned and configured to provide a distance of about 0.75 to about 2 inches between the first contact point and the second contact point.

16. The lathe leveler of claim 12 wherein the first and second leveling arms are dimensioned and configured to provide a distance of about 1 inch to about 1.5 inches between the first contact point and the second contact point.

* * * * *